(12) United States Patent
Wang et al.

(10) Patent No.: US 11,075,563 B2
(45) Date of Patent: Jul. 27, 2021

(54) SEALED OUTER ROTOR MOTOR STRUCTURE

(71) Applicant: GP Enterprises Co., Ltd., Jiangsu (CN)

(72) Inventors: Xian Wang, Jiangsu (CN); Ningning Ding, Jiangsu (CN)

(73) Assignee: GP Enterprises Co., Ltd., Suzhou (CN)

( * ) Notice: Subject to any disclaimer, the term of this patent is extended or adjusted under 35 U.S.C. 154(b) by 99 days.

(21) Appl. No.: 16/626,518

(22) PCT Filed: Mar. 29, 2019

(86) PCT No.: PCT/CN2019/080440
§ 371 (c)(1),
(2) Date: Dec. 25, 2019

(87) PCT Pub. No.: WO2020/143122
PCT Pub. Date: Jul. 16, 2020

(65) Prior Publication Data
US 2020/0373805 A1 Nov. 26, 2020

(30) Foreign Application Priority Data

Jan. 11, 2019 (CN) .......................... 201910026655.9

(51) Int. Cl.
*H02K 5/10* (2006.01)
*H02K 5/16* (2006.01)
(Continued)

(52) U.S. Cl.
CPC ............... *H02K 5/10* (2013.01); *H02K 5/163* (2013.01); *H02K 7/04* (2013.01); *H02K 7/085* (2013.01); *H02K 21/22* (2013.01)

(58) Field of Classification Search
CPC .......... H02K 5/10; H02K 5/163; H02K 5/124; H02K 5/132; H02K 5/136; H02K 5/15;
(Continued)

(56) References Cited

U.S. PATENT DOCUMENTS 2,311,805 A * 2/1943 Yost ....................... H02K 5/225
310/87
4,451,750 A * 5/1984 Heuer .................... H02K 5/225
310/71

(Continued)

FOREIGN PATENT DOCUMENTS

CA       2938534 A1 * 8/2015 ............... H02K 5/00
CN       205356067 U *  6/2016

OTHER PUBLICATIONS

CN205356067U English Translation.*

*Primary Examiner* — Maged M Almawri

(57) ABSTRACT

The present invention discloses a sealed outer rotor motor structure comprising a shell type rotor, a self-aligned bearing housing, an oil seal, a concentric shaft, a stator and magnets. The self-aligned bearing housing is disposed in the shell type rotor. A through type bearing chamber concentric to the shell type rotor is disposed in the self-aligned bearing housing. A sealing ring groove located in the concentric shaft fixing hole is disposed on the concentric shaft. A bearing located within the through type bearing chamber is disposed on the concentric shaft. The oil seal is disposed on the self-aligned bearing housing to achieve sealing of a tail end of the shell type rotor. With the above-described mode, the rotational stability of the shell type rotor of the sealed outer rotor motor structure described by the present invention is high, improving the sealing effects during rotation of the shell type rotor.

10 Claims, 1 Drawing Sheet

(51) Int. Cl.
*H02K 7/04* (2006.01)
*H02K 7/08* (2006.01)
*H02K 21/22* (2006.01)

(58) Field of Classification Search
CPC .......... H02K 5/12; H02K 5/1285; H02K 7/04; H02K 7/085; H02K 7/08; H02K 7/083; H02K 21/22
USPC ................................ 310/88, 87, 90.5, 90, 89
See application file for complete search history.

(56) References Cited

U.S. PATENT DOCUMENTS

| | | | | |
|---|---|---|---|---|
| 4,626,721 A * | 12/1986 | Ouchi | ................... | F04D 29/126 |
| | | | | 174/151 |
| 9,948,155 B2 * | 4/2018 | Moura | ................... | H02K 19/103 |
| 10,312,770 B2 * | 6/2019 | Jones | ................... | H02K 5/1732 |
| 10,396,618 B2 * | 8/2019 | Kawashima | ........... | H02K 5/124 |
| 10,411,546 B2 * | 9/2019 | Hamagishi | ............. | H02K 5/148 |
| 10,541,582 B2 * | 1/2020 | Li | ................... | H02K 5/132 |
| 10,727,716 B2 * | 7/2020 | Jones | ................... | H02K 5/225 |
| 2001/0036416 A1 * | 11/2001 | Obara | ................... | F04D 25/0633 |
| | | | | 417/423.1 |
| 2001/0053042 A1 * | 12/2001 | Lee | ................... | F16C 33/74 |
| | | | | 360/99.08 |
| 2002/0050899 A1 * | 5/2002 | Hashimoto | ............. | H02K 5/10 |
| | | | | 335/220 |
| 2002/0061149 A1 * | 5/2002 | Shingai | ................... | F16C 33/74 |
| | | | | 384/490 |
| 2002/0135247 A1 * | 9/2002 | Liao | ................... | H02K 5/163 |
| | | | | 310/90 |
| 2011/0133582 A1 * | 6/2011 | Bingler | ................... | F04D 13/08 |
| | | | | 310/71 |
| 2014/0050605 A1 * | 2/2014 | Inada | ................... | F04C 29/0085 |
| | | | | 417/420 |
| 2016/0211719 A1 * | 7/2016 | Hidaka | ................... | H02K 1/02 |
| 2017/0025145 A1 * | 1/2017 | Shiraishi | ............. | H02K 5/1677 |
| 2017/0025146 A1 * | 1/2017 | Yoneda | ............. | G11B 19/2009 |
| 2017/0194830 A1 * | 7/2017 | Poretti | ................... | H02K 11/0094 |
| 2019/0193552 A1 * | 6/2019 | Pydin | ................... | H02K 7/116 |

* cited by examiner

SEALED OUTER ROTOR MOTOR STRUCTURE

FIELD OF THE INVENTION

The present invention relates to the field of motor technology, in particular to a sealed outer rotor motor structure.

BACKGROUND OF THE INVENTION

Outer rotor motors are widely used in the fields of deep-sea submersible thrusters, aerospace models and household motors. The structure of outer rotor motors is usually fixed by internal stators, and the rotor housing outside the stator is used for rotation, which brings many difficulties to the sealing of motors.

Most outer rotor motors are used in dry environments without taking into account sealing designs. However, in special occasions, such as deep sea, sewage treatment, jam manufacturing and other manufacturing industries, sealing must be considered. Sealing commonly seen in the market adopts only rust-proof bearings, or is implemented by plastically encapsulating a stator. The plastic encapsulation of a stator only prevents the stator from being short-circuited by water. The rust-proof bearings need to use extremely expensive ceramic bearings, and need to be cleaned in time after each use, which is costly and requires time and labor for maintenance since whenever there are residues (such as impurities in sewage and crystalline salt of seawater) in the rust-proof bearings, the motor will jam and be deactivated, causing the motor to fail.

SUMMARY OF THE INVENTION

The present invention mainly solves the technical problem of providing a sealed outer rotor motor structure which improves the sealing effect and reduces the failure rate of working in sewage and seawater.

In order to solve the above-described technical problem, the present invention adopts a technical solution of providing a sealed outer rotor motor structure. The sealed outer rotor motor structure comprises: a shell type rotor, a self-aligned bearing housing, an oil seal, a concentric shaft, a stator and magnets, wherein a magnet chamber is disposed on an inner wall of the shell type rotor, the magnets are disposed in the magnet chamber, the self-aligned bearing housing is disposed in the shell type rotor, a through type bearing chamber concentric to the shell type rotor is disposed in the self-aligned bearing housing, the through type bearing chamber is open at a front end and is provided at a tail end with a motor fixing boss extending to the outside of an opening of a tail end of the shell type rotor for blocking, a concentric shaft fixing hole is disposed on a front end surface of the shell type rotor, the concentric shaft is disposed in the through type bearing chamber, with a front end extending into the concentric shaft fixing hole, a stator mounting cylinder surface is disposed at an outer side of the self-aligned bearing housing, the stator is disposed on the stator mounting cylinder surface, a bearing located within the through type bearing chamber is disposed on the concentric shaft, a sealed cylinder surface corresponding to an outer side of the oil seal is disposed at a tail end of an inner hole of the shell type rotor, an oil seal mounting cylinder surface corresponding to a mounting hole within the oil seal is disposed on the self-aligned bearing housing, and the oil seal is disposed on the self-aligned bearing housing to achieve sealing of the tail end of the shell type rotor.

In a preferred example of the present invention, the shell type rotor is a hollow thin-walled shell.

In a preferred example of the present invention, a balancing support frame located at an outer side of the shell type rotor is disposed at a front end of the concentric shaft.

In a preferred example of the present invention, a stator positioning step for limiting the stator is disposed on the stator mounting cylinder surface.

In a preferred example of the present invention, a sealing ring groove located in the concentric shaft fixing hole is disposed on the concentric shaft, and a sealing ring is disposed in the sealing ring groove.

In a preferred example of the present invention, a shaft-use retaining ring located at a side surface of the bearing is disposed on the concentric shaft.

In a preferred example of the present invention, a bearing positioning step for limiting the bearing is disposed within the through type bearing chamber.

In a preferred example of the present invention, the oil seal is a multi-lip outer lip type framework oil seal or a multi-lip inner lip type framework oil seal, one or more sealed lips are disposed on the multi-lip outer lip type framework oil seal, the sealed lips are supported by a tensile force of an outer-supported spring and abut closely against the sealed cylinder surface to perform sealing, and the multi-lip inner lip type framework oil seal performs sealing by an elastic contraction force of a spring clamp ring allowing the lips to abut closely against the oil seal mounting cylinder surface.

In a preferred example of the present invention, a sealed positioning step for limiting the oil seal is disposed on the oil seal mounting cylinder surface.

In a preferred example of the present invention, an annular groove is disposed between the oil seal mounting cylinder surface and the motor fixing boss, a motor outlet hole is disposed in the annular groove, and an adhesive sealing layer for waterproofing the motor outlet hole is disposed in the annular groove.

In a preferred example of the present invention, the concentric shaft and the concentric shaft fixing hole are fixed and sealed by means of riveting or by use of a sealing adhesive provided in the concentric shaft fixing hole.

The beneficial effects of the present invention are as follows: the sealed outer rotor motor structure proposed in the present invention especially adopts a shell type rotor, the hollow thin-walled shell has a light weight, which is beneficial to eliminate vibration caused by high centrifugal force generated during high-speed rotation, the sealing failure problem raised by vibration is reduced, the effect of the through type bearing chamber in limiting the bearing is good, the amount of shaft surface run out of the concentric shaft is reduced, the sealing connecting structure of the concentric shaft and the concentric shaft fixing hole facilitates improving the rotational stability of the shell type rotor with the use of a concentric shaft while ensuring the sealing effect, and combined with the multi-lip outer lip framework oil seal, the sealing effect of the shell type rotor during rotation is improved, the maintenance is convenient since there are no exposed bearings, and the stability of working in sewage and seawater is improved.

BRIEF DESCRIPTION OF THE DRAWINGS

In order to more clearly illustrate the technical solutions in examples of the present invention, drawings required to be used for describing the examples will be briefly introduced below. Apparently, the drawings in the following description are merely some examples of the present invention. For those skilled in the art, other drawings can be obtained from these drawings without inventive skills. In the drawings.

DETAILED DESCRIPTION

The technical solutions in the example of the present invention will be clearly and completely described below. Apparently, described example is only part rather than all of the examples of the present invention. All other examples obtained by those of ordinary skill in the art based on the example of the present invention without inventive skills fall within the protection scope of the present invention.

Figure 1:
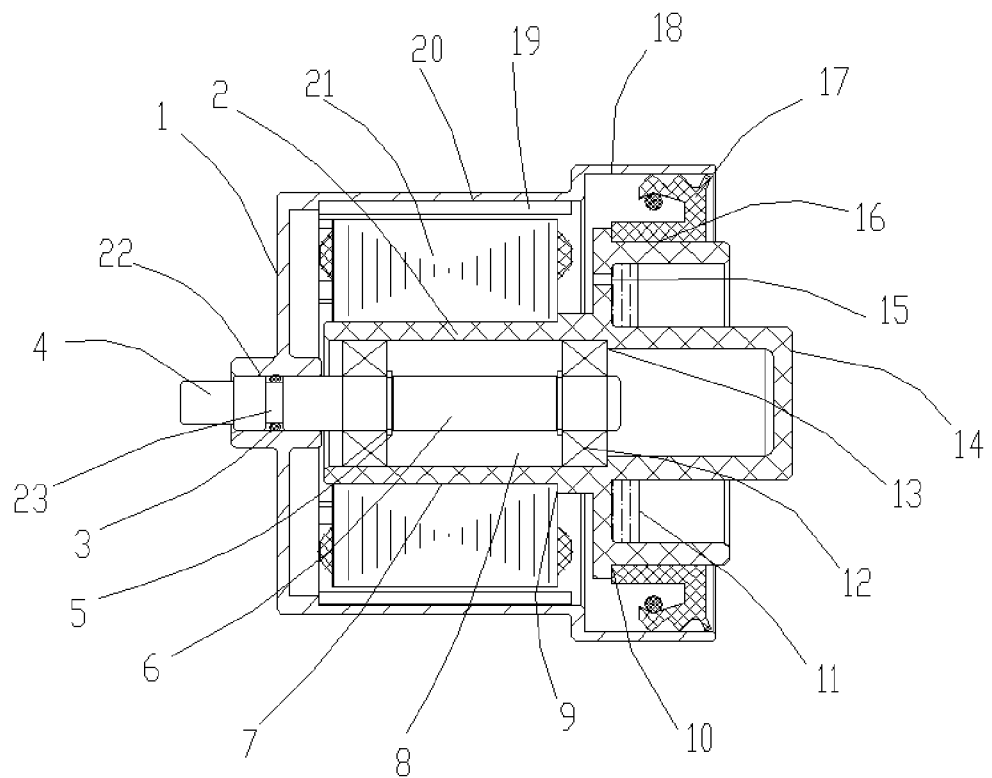
FIG. 1 is a structural schematic view of a preferred example of a sealed outer rotor motor structure of the present invention.
Figure 2:
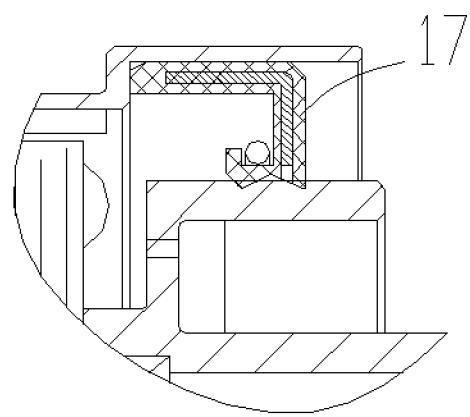
FIG. 2 is a partial structural schematic view of sealing performed by a multi-lip inner lip framework oil seal.

Reference is made to FIGS. 1-2, an example of the present invention comprises:

A sealed outer rotor motor structure, comprising: a shell type rotor 1, a self-aligned bearing housing 2, an oil seal 17, a concentric shaft 6, a stator 21 and magnets 19, where in a magnet chamber 20 is disposed on an inner wall of the shell type rotor 1, the magnets 19 is disposed in the magnet chamber 20 and rotates along with the shell type rotor 1, the shell type rotor 1 is a hollow thin-walled shell and has a light weight, which is beneficial to eliminate vibration caused by high centrifugal force generated during high-speed rotation and thereby reduce the sealing failure problem raised by vibration.

The self-aligned bearing housing 2 is disposed in the shell type rotor 1, a through type bearing chamber 8 concentric to the shell type rotor 1 is disposed in the self-aligned bearing housing 2, the through type bearing chamber 8 is open at a front end and is provided at a tail end with a motor fixing boss 14 extending to the outside of an opening of a tail end of the shell type rotor 1 for blocking, a concentric shaft fixing hole 22 is disposed on a front end surface of the shell type rotor 1, the concentric shaft 6 is disposed in the through type bearing chamber 8 with a front end extending into the concentric shaft fixing hole 22, and the concentric shaft 6 and the concentric shaft fixing hole 22 are fixed and sealed by means of riveting or by use of a sealing adhesive provided in the concentric shaft fixing hole 22. The mounting, removal and maintenance are convenient. A sealing ring groove 23 located in the concentric shaft fixing hole 22 is disposed on the concentric shaft 6, and a sealing ring 3 is disposed in the sealing ring groove 23. The sealing performance is ensured.

A stator mounting cylinder surface 7 is disposed at an outer side of the self-aligned bearing housing 2, the stator 21 is disposed on the stator mounting cylinder surface 7, and a stator positioning step 9 for limiting the stator 21 is disposed on the stator mounting cylinder surface 7, facilitating the mounting and positioning of the stator 21.

A bearing 12 located within the through type bearing chamber 8 is disposed on the concentric shaft 6, a bearing positioning step 13 for limiting the bearing 12 is disposed within the through type bearing chamber 8, a shaft-use retaining ring 5 located at a side surface of the bearing is disposed on the concentric shaft 6 for axial limiting of the shaft, and the shaft surface run out of the bearing and the concentric shaft 6 is reduced by the through type bearing chamber 8, thereby reducing the run out of the shell type rotor 1 during high-speed rotation and improving the stability of operation.

A sealed shaft surface 18 corresponding to an outer side of the oil seal 17 is disposed at a tail end of an inner hole of the shell type rotor 1, an oil seal mounting cylinder surface 16 corresponding to a mounting hole within the oil seal 17 is disposed on the self-aligned bearing housing 2, the oil seal 17 is disposed on the oil seal mounting cylinder surface 16 of the self-aligned bearing housing 2 to achieve sealing of the tail end of the shell type rotor 1, a sealed positioning step 10 for limiting the oil seal 17 is disposed on the oil seal mounting cylinder surface 16 to carry out limiting of the oil seal 17, the oil seal 17 is a multi-lip outer lip type framework oil seal or a multi-lip inner lip type framework oil seal, as shown in FIG. 1, one or more sealed lips are disposed on the multi-lip outer lip type framework oil seal, and the sealed lips are supported by a tensile force of an outer-supported spring and abut closely against the sealed cylinder surface to perform sealing.

As shown in FIG. 2, the multi-lip inner lip type framework oil seal performs sealing by an elastic contraction force of a spring clamp ring allowing the lips to abut closely against an oil seal mounting cylinder surface, the sealing effect is good and the problem of exposing the bearing is avoided, which brings a maintenance-free effect.

A balancing support frame 4 located at an outer side of the shell type rotor 1 is disposed at a front end of the concentric shaft 6, which is beneficial for the concentric shaft 6 to connect with and be supported by an external rotation support structure, reducing the shaking of the concentric shaft 6 and improving the rotational stability of the shell type rotor 1.

An annular groove is disposed between the oil seal mounting cylinder surface 16 and the motor fixing boss 14, a motor outlet hole 15 is disposed in the annular groove for ease of mounting of motor circuits, and an adhesive sealing layer 11 for waterproofing the motor outlet hole 15 is disposed in the annular groove, improving the waterproofing effect of the circuits.

To sum up, the sealed outer rotor motor structure pointed out by the present invention implements sealing from the source of the motor, and adopts a pressure-resistant multi-lip sealing design to directly cut off inlet and outlet of impurities, avoiding the shortcoming of motor jamming, and no cleaning is required after use, reducing maintenance frequency and costs.

The above description only illustrates the examples of the present invention, and thus does not limit the patent scope of the present invention. Any equivalent structure or equivalent process transformation made with the use of the contents of the description of the present invention, or directly or indirectly used in other related technical fields, are included in the patent protection scope of the present invention.

The invention claimed is:

1. A sealed outer rotor motor structure, comprising: a shell type rotor, a self-aligned bearing housing, an oil seal, a concentric shaft, a stator and magnets, wherein a magnets chamber is disposed on an inner wall of the shell type rotor, the magnets are disposed in the magnet chamber, the self-aligned bearing housing is disposed in the shell type rotor, a through type bearing chamber concentric to the shell type rotor is disposed in the self-aligned bearing housing, the through type bearing chamber is open at a front end and is provided at a tail end with a motor fixing boss extending to the outside of an opening of a tail end of the shell type rotor for blocking, a concentric shaft fixing hole is disposed on a front end surface of the shell type rotor, the concentric shaft is disposed in the through type bearing chamber with a front end extending into the concentric shaft fixing hole, a stator mounting shaft surface is disposed at an outer side of the self-aligned bearing housing, the stator is disposed on the stator mounting shaft surface, a bearing located within the through type bearing chamber is disposed on the concentric shaft, a sealed shaft surface corresponding to an outer side of the oil seal is disposed at a tail end of an inner hole of the shell type rotor, an oil seal mounting cylinder surface corresponding to a mounting hole within the oil seal is disposed on the self-aligned bearing housing, and the oil seal is disposed on the self-aligned bearing housing to achieve sealing of the tail end of the shell type rotor.

2. The sealed outer rotor motor structure according to claim 1, wherein the shell type rotor is a hollow thin-walled shell.

3. The sealed outer rotor motor structure according to claim 1, wherein a balancing support frame located at an outer side of the shell type rotor is disposed at a front end of the concentric shaft.

4. The sealed outer rotor motor structure according to claim 1, wherein a stator positioning step for limiting the stator is disposed on the stator mounting cylinder surface.

5. The sealed outer rotor motor structure according to claim 1, wherein a shaft-use retaining ring located at a side surface of the bearing is disposed on the concentric shaft, and a bearing positioning step for limiting the bearing is disposed within the through type bearing chamber.

6. The sealed outer rotor motor structure according to claim 1, wherein the oil seal is a multi-lip outer lip type framework oil seal or a multi-lip inner lip type framework oil seal, one or more sealed lips are disposed on the multi-lip outer lip type framework oil seal, the sealed lips are supported by a tensile force of an outer-supported spring and abut closely against the sealed cylinder surface to perform sealing, and the multi-lip inner lip type framework oil seal performs sealing by an elastic contraction force of a spring clamp ring allowing the lips to abut closely against an oil seal mounting cylinder surface.

7. The sealed outer rotor motor structure according to claim 1, wherein a sealed positioning step for limiting the oil seal is disposed on the oil seal mounting cylinder surface.

8. The sealed outer rotor motor structure according to claim 1, wherein an annular groove is disposed between the oil seal mounting cylinder surface and the motor fixing boss, a motor outlet hole is disposed in the annular groove, and an adhesive sealing layer for waterproofing the motor outlet hole is disposed in the annular groove.

9. The sealed outer rotor motor structure according to claim 1, wherein the concentric shaft and the concentric shaft fixing hole are fixed and sealed by means of riveting or by use of a sealing adhesive provided in the concentric shaft fixing hole.

10. The sealed outer rotor motor structure according to claim 1, wherein a sealing ring groove located in the concentric shaft fixing hole is disposed on the concentric shaft, and a sealing ring is disposed in the sealing ring groove.

* * * * *